INVENTOR
William R. Shaffer,
BY Karl W. Flocks
ATTORNEY

March 21, 1961 W. R. SHAFFER 2,975,979
ROAD STRIPING MACHINE
Filed Feb. 11, 1959 4 Sheets-Sheet 4

INVENTOR
William R. Shaffer,
BY Karl W. Flocks
ATTORNEY

United States Patent Office 2,975,979
Patented Mar. 21, 1961

2,975,979
ROAD STRIPING MACHINE

William R. Shaffer, Huntingdon, Pa., assignor to Wald Industries, Inc., Huntingdon, Pa., a corporation of Pennsylvania Filed Feb. 11, 1959, Ser. No. 792,571

14 Claims. (Cl. 239—150)

The present invention relates to a road striping machine, and more particularly to a road striping machine in which a spray gun carriage is mounted laterally of the main vehicle in line with the seat of the vehicle operator and in which the spray gun carriage is connected to the main vehicle in such a manner as to maintain the spray guns vertically directed.

There are now in widespread use machines to lay a stripe of paint onto the surface of a roadway, these road striping machines usually consisting of a vehicle such as a truck that carries a container for the paint, an air compressor to produce a pressure on the surface of the paint in the container, spray guns to which the paint is delivered and from which the paint is sprayed onto the road surface, these spray guns also being connected to the air compressor. In such machines, the spray guns are usually carried either on a separate carriage towed behind the main vehicle or on a support structure slung underneath the vehicle. Where a separate carriage is mounted behind the main vehicle, it is often found necessary to have an assistant ride on the towed carriage in order to observe and control the operation. This, of course, has the drawback of requiring extra expense for labor. In addition, it is difficult at best to move the road striping machine at approved highway speeds with the towed carriage therebehind, thus causing an undue consumption of time in the transporting of the entire road striping machine from place to place during non-striping operation. As will be apparent, the solution to this problem of carrying the towed carriage either on the main vehicle or a separate roadable vehicle is not an economical one.

Where the spray guns are mounted beneath the main vehicle, it will be apparent that the operation of the spray equipment is not visible to the driver of the vehicle, and accordingly this arrangement is not satisfactory as it has been found that the results produced with such equipment are not of the desired quality. For example, the driver of the vehicle cannot tell when a spray gun has become clogged or when the paint supply is exhausted.

An object of the present invention is to provide a road striping machine in which the spray guns thereof are mounted on a laterally disposed carriage.

Another object of the present invention is the provision of a road striping machine in which the spray guns thereof are mounted adjacent to the seat of the vehicle operator so as to be visible to the operator.

Another object of the present invention is to provide a laterally positioned gun carriage for a road striping machine that is directly supported on the roadway.

A still further object of the present invention is the provision of a laterally positioned gun carriage that supports spray guns at constant height above the roadway.

Yet another object of the present invention is to provide a laterally mounted spray gun carriage that will spray a line on the roadway of constant width.

A still further object of the present invention is the provision of a laterally mounted spray gun carriage in a road striping machine in which the spray guns are maintained perpendicularly disposed to the roadway regardless of variations in height between the spray gun carriage and the main vehicle.

Another object of the present invention is to provide a laterally mounted spray gun carriage on a road striping machine that is readily moved from transport position to operating position and vice versa.

A further object of the present invention is the provision of a road striping machine in which a spray gun carriage is mounted laterally of the main vehicle, may be readily moved between operating and transport positions and will return the spray guns to the proper angle relative to the roadway after movement of the spray gun carriage from and to the operating position thereof.

Yet another object of the present invention is to provide a road striping machine in which a spray gun carriage may be readily mounted laterally on either side of the vehicle, and may be readily moved from one side to the other thereof.

Other objects and the nature and advantages of the instant invention will be apparent from the following description taken in conjunction with the accompanying drawings, wherein.

Figure 1:
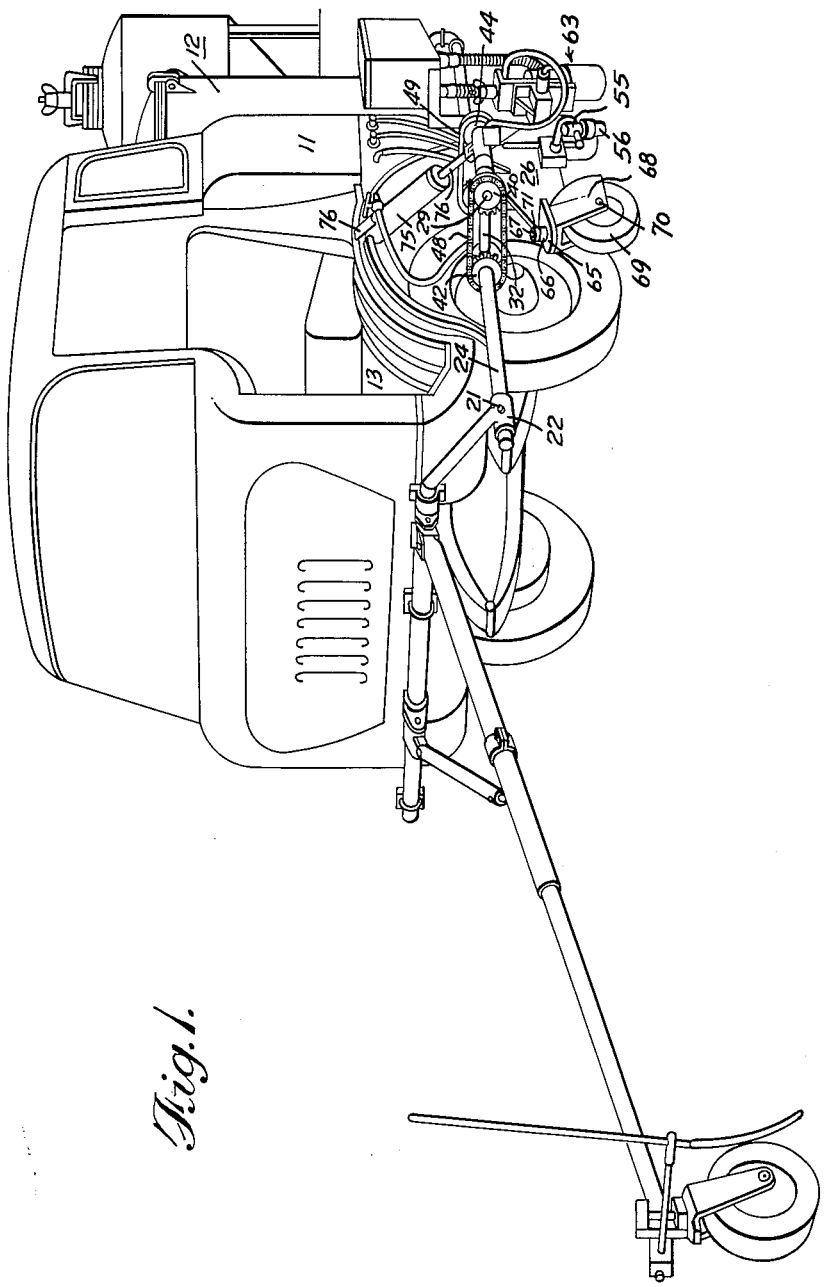
Fig. 1 is a perspective view of a road striping machine in accordance with the present invention.

Referring now to the drawings, wherein like reference numerals are used to designate like or corresponding parts throughout the several views, there is shown in Fig. 1 a road striping machine comprising a truck 11 having a container 12 thereon for paint and a seat 13 for the operator. A spray gun carriage 14 is shown mounted at the left side of the truck 11.

Figure 2:
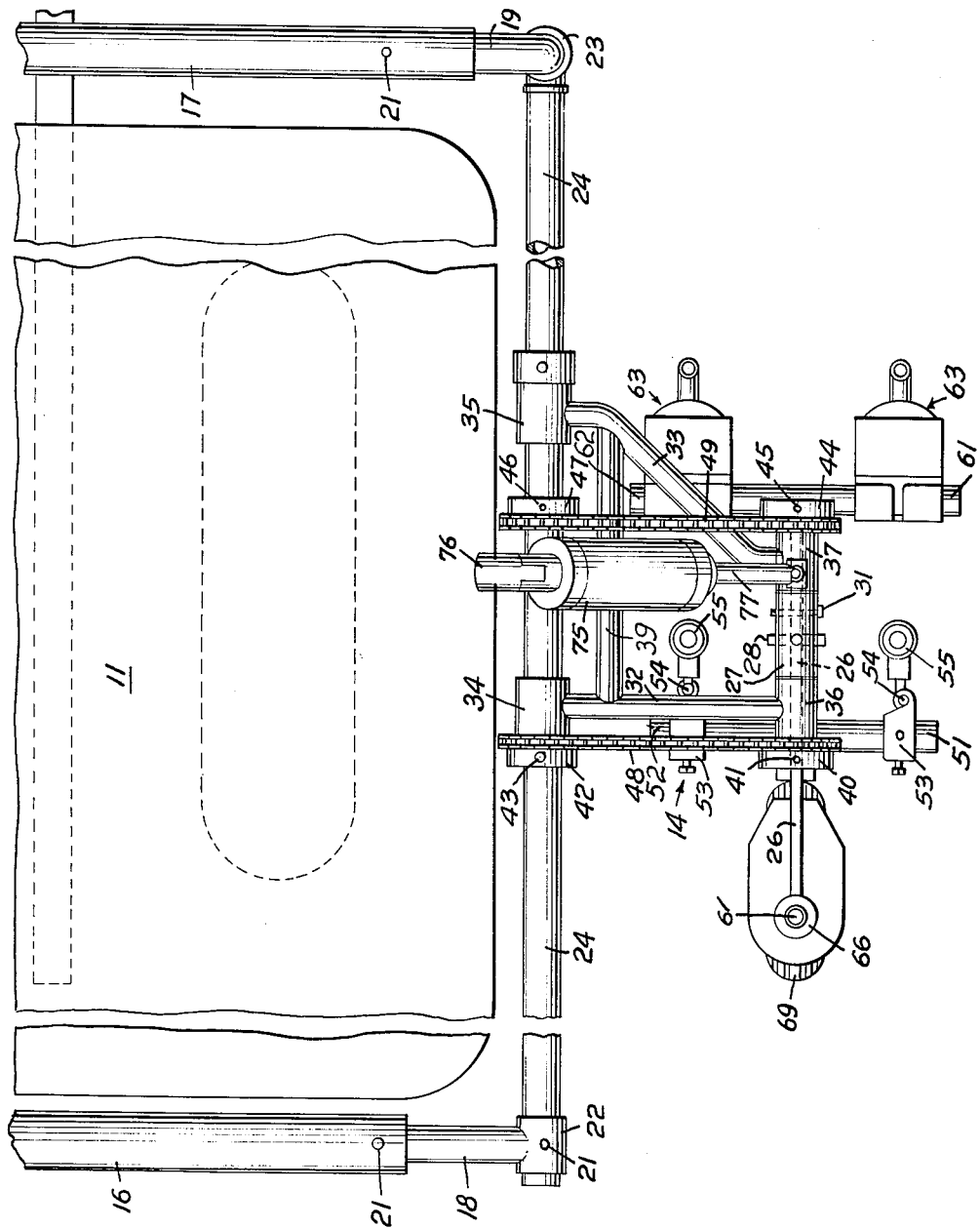
Fig. 2 is a plan view of the spray gun carriage and its mounting on the main vehicle.

Referring now to Fig. 2, it may be seen that the truck 11 has a forward transversely extending horizontal tubular member 16 and a similar rearward tubular member 17. A bar 18 extends into the tubular member 16 and is supported thereby and a similar bar 19 extends into and is supported by the rear tubular member 17. Bolts 21 extend through the member 16 and the bar 18, and the member 17 and the bar 19, respectively, to secure the bars in the tubular members. At the outer end thereof, the bar 18 carries a collar 22 that extends longitudinally of the truck 11 and at the outer end of bar 19 there is screw-threaded thereto an L-connector 23, connector 23 having one axis thereof vertical and the other axis horizontal and in alignment with the collar 22.

A longitudinally extending tubular support 24 is screw-threadedly connected to L-connector 23 at its rear end and is carried in the collar 22 at the front end, being secured in the latter by a bolt 21.

Figure 3:
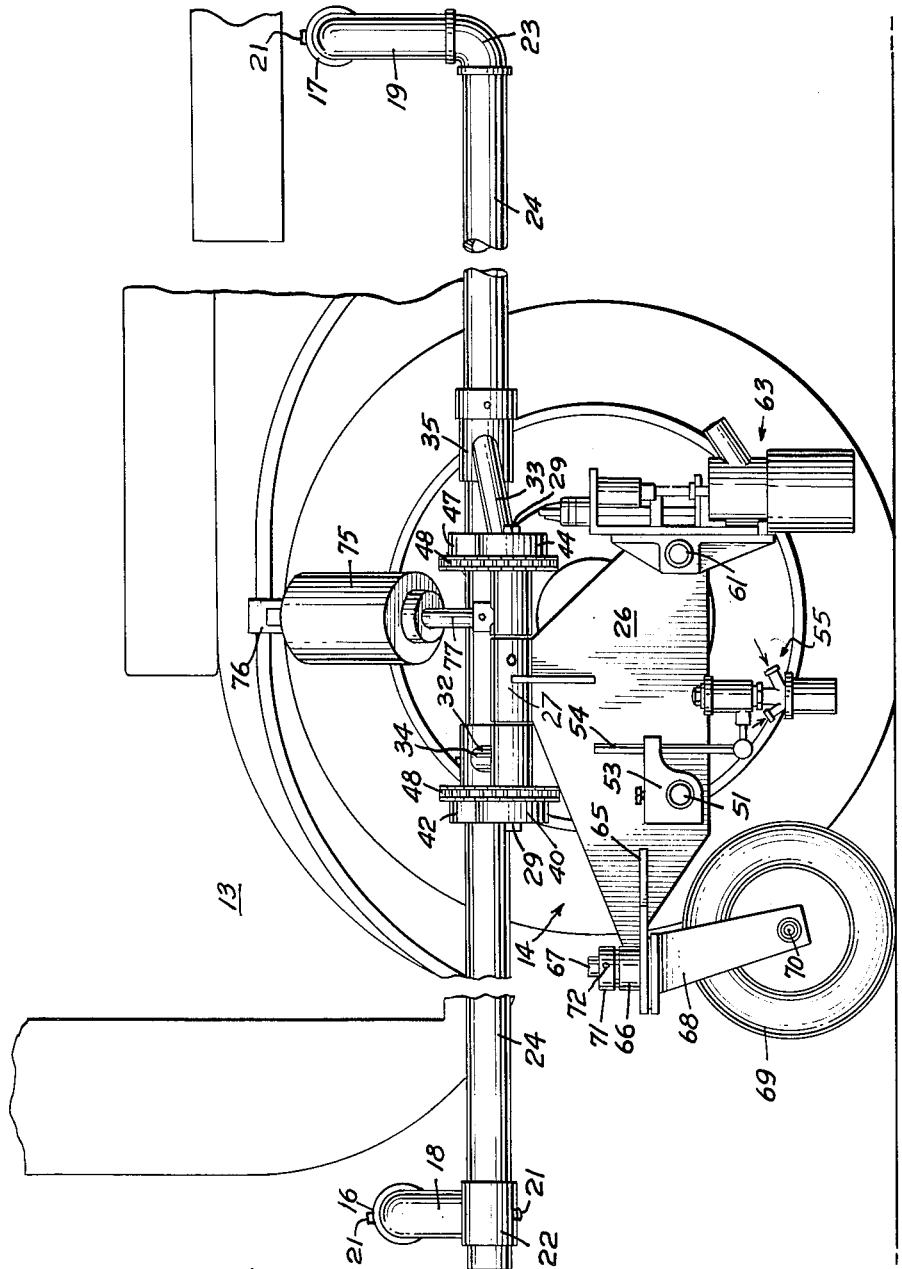
Fig. 3 is a side elevation of the apparatus in accordance with the invention.

The carriage 14 comprises a main frame made of a plate 26 and having secured thereto at the top thereof a longitudinally extending collar 27, as may be seen in Fig. 3. Gusset plates 28 assist in securing the collar 27 to plate 26. A shaft 29 extends through the collar 27 and is connected thereto by a pin 31.

A pair of connecting arms 32 and 33 may be seen best in Fig. 2 to have collars secured at each end thereof, collars 34 and 35 of arms 32 and 33, respectively, receiving therein in a rotatable manner the tubular support 24. The collar 36 at the outer end of arm 32 and the collar 37 at the outer end of arm 33 are disposed on either side of the collar 27 on plate 26, and rotatably receive the shaft 29 therein, cross member 39 is connected to arms 32 and 33.

In a preferred embodiment a sprocket 40 is mounted on shaft 29 forwardly of collar 36, and is secured irrotationally thereto by a pin 41. A similar sprocket 42 is coplanar with sprocket 40 and is secured irrotationally to the tubular support 24 by the pin 43. A similar sprocket 44 is secured by a pin 45 and the sprocket 44 is coplanar with a sprocket 46 secured to the tubular support. Chain 48 is trained over the sprockets 40 and 42 and a second chain 49 is trained over the sprocket 44 and 46.

The above described sprocket and chain construction is a preferred embodiment of positive drive mechanisms used in this apparatus. It is significant that a positive drive be effected between the sun gear type mountings on tubular support 24 and its associated planetary gear type mountings on shaft 29. The words "positive drive mechanism" as used in the appended claims means a drive of the character disclosed as distinguished from slip-type friction drives.

The plate 26 carries a pair of forward transversely extending rods 51 and 52, and each of these rods has a clamp 53 secured thereto, each of these clamps 53 holding a substantially vertically extending rod 54 that supports at its lower end a spray gun 55 that includes a shroud 56. The spray guns 55 are connected with the container 12 for paint and a source of air under pressure and by tubes in the usual manner.

The plate 26 also carries at the rear thereof two support rods 61 and 62, and dispensers 63 for glass beads are carried on the rods 61 and 62, each of the dispensers 63 being to the rear of and in line with one of the spray guns 55.

The plate 26 has a horizontal plate 65 secured thereto at the front end thereof, and plate 65 carries a collar 66. Through the collar 66 there extends the spindle 67 of a rearwardly inclined fork 68 carrying at its lower end a road engaging wheel 69 on an axle 70. The spindle 67 is prevented from falling out of the collar 66 by a collar 71 attached to the spindle 67 by a set screw 72.

A pneumatic cylinder 75 is secured to the truck 11, as to a fender by a removable clamp 76, and the free end of the piston rod 77 of the cylinder 75 is connected to the collar 37 by any suitable means. It will be understood of course that cylinder 75 is free to rotate to a limited extent about a longitudinal axis relative to clamp 76.

In operation, the bars 18 and 19 are placed in the tubular members 16 and 17 and secured therein by the bolts 21 and the bars 18 and 19 serve to support the tubular support 24; the spray gun carriage 14 is placed in position as shown in the drawing hereof. Thereafter, the spray guns 55 and dispensers 63 are adjusted as to position, direction and operation in known manner, the cylinder 75 being at this time inactive, i.e., it exerts neither an upward nor a downward force on the collar 37. Thus, most of the weight of the spray gun carriage 14 is supported by the wheel 69.

Road striping operations may then be begun, and either one or both of the spray guns and dispensers may be in operation. The spray guns 55 will be supported adjacent to the operator's feet 13, so that the operator of the vehicle may be in complete control of the spraying operation and may observe the performance of the spray guns 55. Due to the fact that the spray guns 55 are supported at a constant height above the roadway, they will spray a line of constant width.

Should there be a change in, for example, the crown of the road and thus a change in the relative elevation between the longitudinal axis of the truck 11 and the longitudinal axis of the spray gun carriage 14, the spray guns 55 will remain directed vertically onto the roadway during these changes, this effect being obtained from the operation of the parts that will be described in more detail below.

Also, should it be desired to raise the carriage 14 either partially or fully into transport position, the spray guns will always remain with their axes vertical so that upon return thereof to the operating position they will be in the same adjustment as they were previous to the lifting of the spray gun carriage 14.

Figure 4:
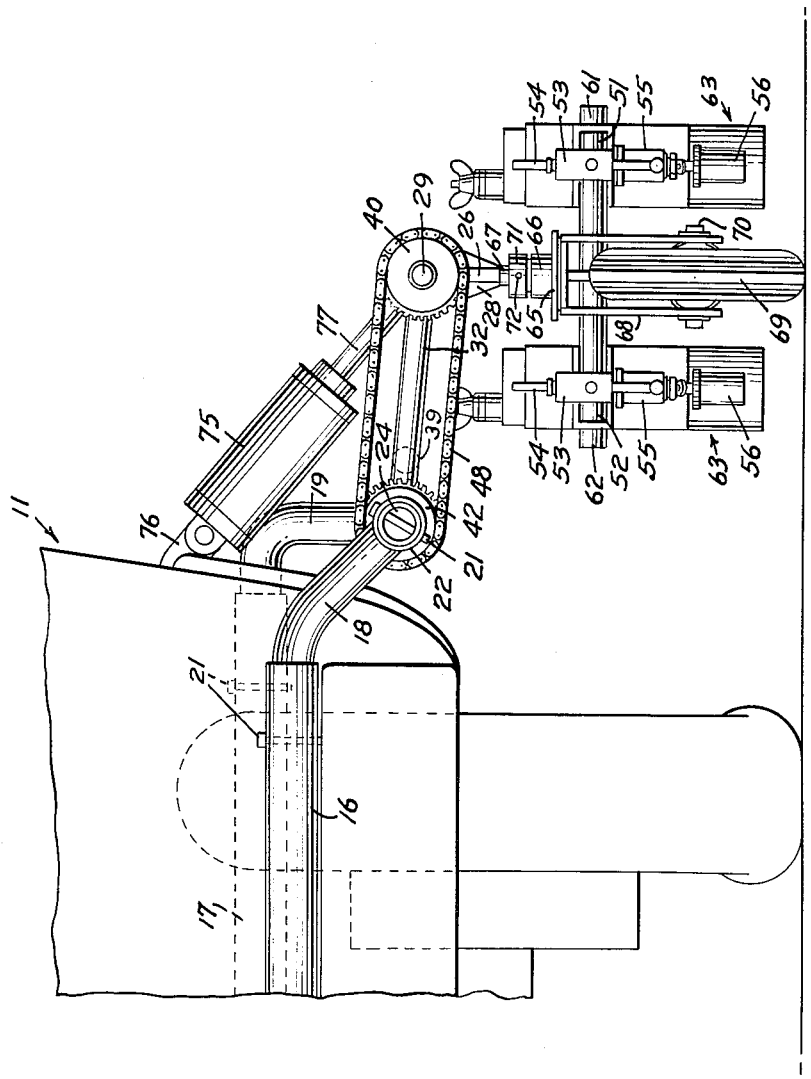
Fig. 4 is a front elevational view thereof.

To obtain the above mentioned results, and referring particularly to Fig. 4, it will be seen that as the shaft 29 moves in an arc about the axis of tubular support 24 the sprocket 42 will be held in its fixed position by the pin 43 that joins it to the tubular support 24. Thus, sprocket 42 cannot rotate and therefore the only relative motion that is possible between it and the chain 48 is for the chain to "walk" around the sprocket 42. Consequently, the chain 48 must also "walk" around the sprocket 40, and in doing this the shaft 29, being fixed to sprocket 40, is also prevented from rotating. Thus, it may be seen that the effect of the parts is to cause shaft 29 to revolve about the axis of tubular support 24 without rotating about its own axis. Since the plate 26, collar 27 and shaft 29 are all fixed together, the plate 26 must remain in planes that are parallel to the plane of its initial position, thus keeping the axes of spray gun 55 always parallel to the original positions thereof.

To change the apparatus to the righthand side of the truck 11, it is only necessary to use a few simple hand tools. First, the bolts 21 in the tubular members 16 and 17 are removed and the entire assemblage comprising the bars 18 and 19, the tubular support 24 and the spray gun carriage 14 are slid to the left so as to remove the bars 18 and 19 from the tubular members 16 and 17. Then bolt 21 is removed from the collar 22, the four pins 41, 43, 45 and 47 are removed from their sprockets. It will be understood, of course, that the clamp 76 will have been removed as will have been the various connections between the spray guns 55, the dispensers 63 and their respective supply containers.

The tubular support 24 is then rotated over the shaft 29 so as to lie on the other side thereof. Bar 19 is then rotated 180° about a vertical axis by means of its connection with the L-shaped connector 23. The bar 18 and collar 22 are removed from the tubular support 24, turned around and then reassembled and the bars 18 and 19 then inserted into the right-hand end of tubular members 16 and 17. All sprocket pins and bolts are reinserted into their proper places and the removable clamp 76 is clamped into the right-hand side of the truck 11. It will be understood of course that the connection between the free end of piston rod 77 and the collar 37 is such as to permit the rod 77 to incline upwardly from either side of the collar 37. Finally, the connections to the supply containers for the spray guns 55 and dispenser 63 are restored and the entire apparatus is then ready for adjustment to working conditions.

There has been provided a spray gun carriage that is disposed laterally of the main vehicle of a road striping machine, the spray gun carriage being so disposed that the operator of the vehicle may observe the operation of the spray guns. The spray gun carriage may be readily moved between operating and transport positions by the control of a pneumatic cylinder and the construction is such that the spray guns will always return to their proper relationship with the roadway after removal of the spray guns with the spray gun carriage from the operating position. Also, there has been provided a spray gun carriage and mount therefor that permits the same spray gun carriage to be used on either the left-hand or right-hand side of the main vehicle of the road striping machine.

It will be obvious to those skilled in the art that various changes may be made without departing from the spirit of the invention and therefore the invention is not limited to what is shown in the drawings and described in the specification but only as indicated in the appended claims.

What is claimed is:
1. A road striping machine comprising a vehicle having a pair of spaced transversely extending horizontal tubular members, a bar carried in and removably secured to each of said tubular members, a collar at the outer end of one of said bars, a longitudinally extending tubular support removably secured in said collar and vertically pivotally connected to said other bar, a carriage comprising a main frame having a longitudinally extending collar, a shaft in said collar and pin connected thereto, a pair of connecting arms each having a collar at each end thereof, a collar of each of said arms rotatably receiving said tubular support therein and the other collar of each of said arms rotatably receiving said shaft therein, a first pair of axially spaced sprockets fixedly attached to said shaft, a second pair of axially spaced sprockets fixedly attached to said tubular support, the sprockets of said second pair of sprockets each being coplanar with a sprocket of said first pair of sprockets, a chain operatively engaging each two coplanar sprockets, a downwardly directed paint spray gun mounted on said frame, a caster wheel having a spindle rotatably received in said frame, and a fluid operated cylinder and piston operatively connected to said vehicle and said gun carriage to raise and lower the same about said tubular support.

2. A road striping machine comprising a vehicle having a pair of spaced transversely extending horizontal tubular members, a bar carried in and removably secured to each of said tubular members, a collar at the outer end of one of said bars, a longitudinally extending tubular support removably secured in said collar and vertically pivotally connected to said other bar, a carriage comprising a main frame having a longitudinally extending collar, a shaft in said collar and pin connected thereto, a pair of connecting arms each having a collar at each end thereof, a collar of each of said arms rotatably receiving said tubular support therein and the other collar of each of said arms rotatably receiving said shaft therein, a first pair of axially spaced sprockets fixedly attached to said shaft, a second pair of axially spaced sprockets fixedly attached to said tubular support, the sprockets of said second pair of sprockets each being coplanar with a sprocket of said first pair of sprockets, a chain operatively engaging each two coplanar sprockets, a downwardly directed paint spray gun mounted on said frame, and a caster wheel having a spindle rotatably received in said frame.

3. A road striping machine comprising a vehicle, a longitudinally extending tubular support carried by said vehicle, a carriage comprising a main frame having a longitudinally extending collar, a shaft in said collar and pin connected thereto, a pair of connecting arms each having a collar at each end thereof, a collar of each of said arms rotatably receiving said tubular support therein and the other collar of each of said arms rotatably receiving said shaft therein, a first pair of axially spaced sprockets fixedly attached to said shaft, a second pair of axially spaced sprockets fixedly attached to said tubular support, the sprockets of said second pair of sprockets each being coplanar with a sprocket of said first pair, a chain operatively engaging each two coplanar sprockets, a downwardly directed paint spray gun mounted on said frame, and a caster wheel having a spindle rotatably received in said frame.

4. A road striping machine comprising a vehicle, a longitudinally extending tubular support carried by said vehicle, a carriage comprising a main frame having a longitudinally extending collar, a shaft in said collar and pin connected thereto, a pair of transverse connecting arms, means rotatably connecting said arms to said tubular support and to said shaft, a first pair of axially spaced sprockets fixedly attached to said shaft, a second pair of axially spaced sprockets rotatably mounted on said tubular support, the sprockets of said second pair of sprockets each being coplanar with a sprocket of said first pair, a chain operatively engaging each two coplanar sprockets, a downwardly directed paint spray gun mounted on said frame, and a caster wheel having a spindle rotatably received in said frame.

5. A road striping machine comprising a vehicle, a longitudinally extending tubular support carried by said vehicle, a carriage comprising a main frame having a longitudinally extending collar, a shaft in said collar and pin connected thereto, means connecting said carriage to said support for rotational movement thereabout, a first pair of axially spaced sprockets fixedly attached to said shaft, a second pair of axially spaced sprockets rotatably mounted on said tubular support, the sprockets of said second pair of sprockets each being coplanar with a sprocket of said first pair, a chain operatively engaging each two coplanar sprockets, a downwardly directed paint spray gun mounted on said frame, and a caster wheel having a spindle rotatably received in said frame.

6. A road striping machine comprising a vehicle, a longitudinally extending tubular support carried by said vehicle, a carriage, means connecting said carriage to said support for rotational movement thereabout, a positive drive mechanism operatively connected to said carriage and said support for maintaining the carriage vertical axis in parallel positions during said rotational movement thereof about said support, and a downwardly directed spray gun mounted on said carriage.

7. The road striping machine of claim 6 and further comprising a caster wheel having a spindle rotatably received in said carriage.

8. The road striping machine of claim 7, and further comprising means connected to said carriage and vehicle to cause said carriage to rotate about said support.

9. The road striping machine of claim 6, and further comprising means connected to said carriage and vehicle to cause said carriage to rotate about said support.

10. A road striping machine comprising a vehicle, a carriage laterally of said vehicle, a spray gun on said carriage, means pivotally connecting said carriage to said vehicle for rotational movement about a longitudinally extending axis, and a positive drive mechanism connecting said carriage and vehicle for maintaining the carriage vertical axis in parallel positions during said rotational movement.

11. The road striping machine of claim 10 and further comprising a caster wheel having a spindle rotatably received in said carriage.

12. The road striping machine of claim 11, and further comprising means connected to said carriage and vehicle to cause said carriage to rotate about said support.

13. The road striping machine of claim 10, and further comprising means connected to said carriage and vehicle to cause said carriage to rotate about said support.

14. A road striping machine comprising a vehicle having a pair of spaced transversely extending tubular horizontal members, a bar carried in and removably secured to each of said tubular members, a collar at the outer end of one of said bars, a longitudinally extending tubular support removably secured in said collar and connected to said other bar and pivoting about a vertical axis, a carriage laterally of said vehicle and having a spray gun thereon, means connecting said carriage to said support for rotational movement thereabout, means pivotally connecting said carriage to said vehicle for rotational movement about a longitudinally extending axis, and a positive drive mechanism connecting said carriage and vehicle for maintaining the carriage vertical axis in parallel positions during said rotational movement.

References Cited in the file of this patent
UNITED STATES PATENTS 2,317,288 McCubbin _____ Apr. 20, 1943

FOREIGN PATENTS 111,049 Australia _____ July 25, 1940